(12) United States Patent
Morel et al.

(10) Patent No.: US 12,406,199 B2
(45) Date of Patent: Sep. 2, 2025

(54) QUANTUM DEVICE

(71) Applicant: COMMISSARIAT A L'ENERGIE ATOMIQUE ET AUX ENERGIES ALTERNATIVES, Paris (FR)

(72) Inventors: Adrien Morel, Grenoble (FR); Franck Badets, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 581 days.

(21) Appl. No.: 17/901,623

(22) Filed: Sep. 1, 2022

(65) Prior Publication Data

US 2023/0080817 A1 Mar. 16, 2023

(30) Foreign Application Priority Data

Sep. 16, 2021 (FR) ........................................ 2109709

(51) Int. Cl.
*G06N 10/40* (2022.01)

(52) U.S. Cl.
CPC ................... *G06N 10/40* (2022.01)

(58) Field of Classification Search
USPC ........................................................ 716/100
See application file for complete search history.

(56) References Cited

U.S. PATENT DOCUMENTS

| 2019/0392352 | A1 | 12/2019 | Lampert et al. | |
| 2022/0188687 | A1* | 6/2022 | Morel | G06N 10/40 |
| 2023/0093578 | A1* | 3/2023 | Ruskuc | G06N 10/40 |
| | | | | 716/100 |
| 2023/0229952 | A1* | 7/2023 | Pakkiam | G06N 10/70 |
| | | | | 716/100 |

FOREIGN PATENT DOCUMENTS

FR 3 089 724 A1 6/2020

OTHER PUBLICATIONS

Vandersypen, et al., "Interfacing spin qubits in quantum dots and donors—hot, dense and coherent", Arxiv.Org, Dec. 2016.
Bonteanu, "A current controlled CMOS current amplifier", 2017 5th International Symposium on Electrical and Electronics Engineering (ISEEE), 2017.

(Continued)

*Primary Examiner* — Brian Ngo
(74) *Attorney, Agent, or Firm* — BakerHostetler

(57) ABSTRACT

A quantum device includes multiple spin qubits, multiple electrometers, each being capacitively coupled to one of the spin qubits, multiple injection-locked oscillators, each being coupled to one of the electrometers and designed to transmit an excitation signal to the electrometer to which it is coupled, each excitation signal having a different frequency, an amplification circuit comprising at least one amplifier, wherein the device comprises a feedback loop coupling the output of the amplification circuit to an input of each injection-locked oscillator and through which an injection signal flows, each injection-locked oscillator being designed to receive the injection signal and, as a function of the injection signal, maintain or decrease its excitation signal.

15 Claims, 10 Drawing Sheets

(56) References Cited

OTHER PUBLICATIONS

Guevel, et al., "19.2 A 110mK 295µW 28nm FDSOI CMOS Quantum Integrated Circuit with a 2.8GHz Excitation and hA Current Sensing of an On-Chip Double Quantum Dot", 2020 IEEE International Solid-State Circuits Conference—(ISSCC), 2020.
Yoon, "LC-tank CMOS Voltage-Controlled Oscillators using High Quality Inductors Embedded in Advanced Packaging Technologies", Georgia Institute of Technology, 2004.
Reilley, et al., "Fast single-charge sensing a RF quantum point contact", Applied Physics Letters 91, 162101, 2007.

* cited by examiner

QUANTUM DEVICE

CROSS-REFERENCE TO RELATED APPLICATION

This application claims priority to foreign French patent application No. FR 2109709, filed on Sep. 16, 2021, the disclosure of which is incorporated by reference in its entirety.

FIELD OF THE INVENTION

The invention relates to a quantum device. The field of the invention is that of quantum devices, and more particularly that of processing quantum information.

BACKGROUND

A quantum system is based on the use of a quantum state with multiple levels. In a number of fields, such as in electronics, quantum systems may comprise more than two levels, which is similar to conventional electronics where N values may be used, where N is greater than 2. A quantum system comprising various levels may be described by considering only its two first energy levels. In particular, quantum computing is based on the use of a quantum state with two measurable levels as an information vector, called a qubit or quantum bit, and the laws of quantum mechanics (superposition, entanglement, measurement) to run algorithms. A quantum device, or computer, allows the quantum state of these qubits to be manipulated, in particular for the purpose of performing operations. Unlike a conventional electronic or computing machine (operating with two voltage levels corresponding to binary states of 0 and 1), a quantum device is more akin to an analogue machine, in that the quantum state of the qubits can take an infinite number of values.

A system using an electron or a quasiparticle with spin ½ may be used to embody a qubit, known as a spin qubit, the two levels corresponding to the two possible spin orientations. Spin qubits may be formed in a semiconductor, advantageously silicon. Semiconductor technologies are being studied with a view to producing spin qubits because of their high potential for integration, just like conventional electronics. Electrons or holes are individually confined in quantum wells kept at cryogenic temperatures (below 1 kelvin (K)) in a cryostat and produced within electrostatically defined nano-sized confinement structures which, in the case of silicon, have an architecture similar to that of MOSFETs. These confinement structures correspond to quantum dots. A quantum dot behaves like a potential well confining one or more elementary charges (electrons or holes) in a semiconductor region.

A spin qubit is read by using another quantum dot, called a read quantum dot, which is coupled to that of the spin qubit to be read. These two quantum dots form two potential wells separated by a potential barrier. Each of the two quantum dots comprises an electrostatic control gate arranged on a first semiconductor region in which the potential wells of the quantum dots are formed. The potential wells are arranged between second semiconductor regions forming charge carrier reservoirs, referred to as the source and drain by analogy with MOSFET technology. A quasiparticle may be a hole or an electron. The spin of the quasiparticle in the quantum dot of the qubit to be read is used as a "reference spin" while the spin of the quasiparticle in the read quantum dot is measured after being manipulated.

There are various methods for reading spin qubits. The first consists in measuring the capacitance between two quantum dots, which is representative of their relative states. The second consists in measuring the conductance of an electrometer, this conductance being representative of the state of the qubit close to the electrometer. See Vandersypen 2016 in this regard.

The first method for reading spin qubits consists in measuring the capacitance between the quantum dot of the qubit to be read and the read quantum dot, which corresponds to a representation of their relative states. For this, a reflectometry device is generally used. A high-frequency signal (e.g. between 100 MHz and a few GHz) is sent to the gate of the read quantum dot from test instruments arranged at room temperature outside the cryostat that contains the quantum dots. The signal is reflected and then demodulated. An inductance is placed at the end of the line at the location of the qubit in order to create an LC resonator consisting of this inductance, of a parasitic capacitance and of the quantum capacitance $C_q$ formed by the qubit. When the value of $C_q$ varies, the phase and amplitude of the reflected signal vary, which may be detected by the measurement instruments arranged at room temperature. It is thus possible to know the relative spin state (parallel or antiparallel) of the electron in the read quantum dot according to the spin state of the electron in the quantum dot of the qubit to be read.

With this first reading method, it is necessary either to have a number of wires equal to the number of qubits to be excited running from the cryostat, which becomes impossible when the number of qubits is large, for example more than 1000, or to send multiple signals at various frequencies through the same wire and to differentiate between these frequencies using the LC resonators arranged at cryogenic temperature. In this latter solution, it is therefore necessary for the resonant frequency of the LC resonator associated with each qubit to be calibrated and different for each resonator. There is thus a trade-off between the frequency spacing between each qubit (defined by the quality factor of the LC resonators since the higher the quality factor, the greater the number of qubits addressed by a single row), the area taken up by the inductances (the smaller the inductance, the lower its quality factor) and the time taken for the readout (inversely proportional to the quality factor of the LC resonator).

Additionally, with this first reading method, the use of magnetic cores to facilitate the integration of the inductances is limited by the strong static magnetic field required to reveal the quasiparticles' spins which saturates the cores' magnetic permeabilities. Air-core inductors do not have this problem, but they occupy a much larger area, limiting their widespread use inside the cryostat.

Inter-inductance coupling may also present new problems when measuring qubits simultaneously using a number of these inductances excited by the reflectometry signals.

The second method consists in measuring the conductance of an electrometer coupled to the quantum dot of the qubit to be read, this conductance being representative of the state of the qubit. Specifically, by virtue of the Zeeman effect (splitting an atom's energy level into multiple distinct energy sublevels in the presence of an external magnetic field), when the spin of the quasiparticle is oriented upwards, it is necessarily in the "high" energy state (which state will be referred to hereinafter as H). Conversely, if the spin of the quasiparticle is oriented downwards, the quasiparticle is in the "low" energy state (which state will be referred to hereinafter as L). By placing the energy level of the reservoir close to a quantum dot between H and L, the quasiparticle will tend to escape from the quantum dot when it is in the H state and remain in the quantum dot when it is in the L state (Pauli blockade). It is thus possible to convert the spin of the quasiparticle into charge information (quasiparticle present or not present in the quantum dot), this conversion commonly being called spin-to-charge conversion. This charge information may be read by an electrometer such as a single-electron transistor (SET) or a quantum point contact (QPC), the conductance of which varies as a function of its electrostatic environment. For further information on QPCs reference may be made to Reilley 2007.

With this second method, variation in the spin of the quasiparticle is converted into a variation in the charge of the quantum dot (by way of Pauli blockade) which leads to a variation in the conductance of the electrometer, which results in a variation in the current flowing in the electrometer. This current may then by amplified using a transimpedance amplifier (TIA). Typically, this readout is used with a TIA arranged at room temperature connected to an electrometer. It is therefore not possible to use this solution to address a large number of qubits, for example a whole array of qubits, because it would be necessary either to have a number of wires at least equal to the number of qubits addressed running from the cryostat, which requires far too much space, or to arrange all of the TIAs in the cryostat, which is not possible in view of the cooling capacities of current cryostats (1 W maximum for operation at 4 K, or 1 mW for operation at 100 mK). In addition, the readout speed of such a solution is limited by the capacitance of the wires (between 100 and 300 pF) to be charged upstream of the TIAs arranged at room temperature. The bandwidth of such a system would struggle to exceed 10 kHz.

SUMMARY OF THE INVENTION

One object of the invention is to overcome at least one of the aforementioned drawbacks.

A further object of the invention is a quantum device designed to minimize the number of wires per spin qubit.

Another object of the invention is to provide a quantum device that consumes less power.

Yet another object of the invention is to provide a more compact quantum device.

At least one of the aforementioned objects is achieved by a quantum device comprising:
multiple spin qubits, each comprising at least one quantum dot,
multiple electrometers, each being capacitively coupled to a potential well of the at least one quantum dot of at least one of the spin qubits, and
multiple injection-locked oscillators, each being coupled to at least one electrode of one of the electrometers and designed to transmit an oscillating signal called an excitation signal, to at least one input electrode of the electrometer to which it is coupled, each excitation signal having a different frequency,
characterized in that it also comprises
an amplification circuit comprising at least one amplifier, said amplification circuit being coupled to the output of each electrometer and comprising an output,
and in that said device comprises a feedback loop coupling the output of said amplification circuit to an input of each injection-locked oscillator and through which an electrical signal, called an injection signal, flows, comprising components at the frequencies of said excitation signals, each injection-locked oscillator being designed to receive the injection signal and, as a function of said injection signal, keep its excitation signal in a first operating state or decrease its excitation signal to a second operating state.

According to these features, the device according to the invention allows a plurality of spin qubits to be read using a single amplification circuit which may comprise just one amplifier, N electrometers and N injection-locked oscillators, where N is greater than 1. As such, the device according to the invention allows a plurality of spin qubits to be read while limiting the number of wires per spin qubit.

Additionally, according to the invention, the output of the amplification circuit is connected to an input of the N injection-locked oscillators which allows the injection signal to be injected into the injection-locked oscillators which are used to excite the electrometers. According to the invention, each injection-locked oscillator receives as input an injection signal comprising all of the components of the excitation signals of the device according to the invention and transmits a single excitation signal as output. In particular and for each injection-locked oscillator, the presence of an injection signal at the resonant frequency, preferably with a suitable phase (generally in phase opposition) drastically reduces the amplitude of the oscillation of the injection signal transmitted by the injection oscillator, whereas an injection signal at a different frequency has no effect on the operation of the injection oscillator in question. Each injection-locked oscillator thus has two alternative operating states: the first state in which the excitation signal oscillates according to an initial state, and the second state in which the injection signal is decreased. The device according to the invention thus allows the number of electronic components used to be decreased. Thus, in the device according to the invention, power consumption and the space taken up by the electronic components are optimized, providing a compact device that consumes less power than the devices known from the prior art.

One subject of the invention is a quantum device comprising:
multiple spin qubits, each comprising at least one quantum dot,
multiple electrometers, each being capacitively coupled to a potential well of the at least one quantum dot of at least one of the spin qubits, and
multiple injection-locked oscillators, each being coupled to at least one electrode of one of the electrometers and designed to transmit an oscillating signal, called an excitation signal, to at least one input electrode of the electrometer to which it is coupled, each excitation signal having a different frequency,
an amplification circuit comprising at least one amplifier, said amplification circuit being coupled to the output of each electrometer and comprising an output, characterized in that said device comprises a feedback loop coupling the output of said amplification circuit to an input of each injection-locked oscillator and through which an electrical signal, called an injection signal, flows, comprising components at the frequencies of said excitation signals, each injection-locked oscillator being designed to receive the injection signal and, as a function of said injection signal, keep its excitation signal in a first operating state or decrease its excitation signal to a second operating state.

Another subject of the invention is a method for reading multiple spin qubits, each comprising a quantum dot, said method using multiple electrometers, each being capacitively coupled to a potential well of the at least one quantum dot of at least one of the spin qubits, multiple injection-locked oscillators, each being coupled to at least one electrode of one of the electrometers, an amplification circuit, said amplification circuit being coupled to the output of each electrometer and comprising at least one amplifier and an output, said method comprising:

each of the injection-locked oscillators transmitting an oscillating signal, called an excitation signal, to at least one input electrode of the electrometer to which it is coupled, each excitation signal having a different frequency, characterized in that said method further comprises:

injecting a signal, called an injection signal, into each injection-locked oscillator via a feedback loop coupling the output of said amplification circuit to the input of each injection-locked oscillator, the injection signal comprising components at the frequencies of said excitation signals and, for each injection-locked oscillator, decreasing or maintaining the excitation signal resulting from said injection signal.

BRIEF DESCRIPTION OF THE DRAWINGS

The invention will be better understood and other advantages will become apparent from reading the following description given by way of non-limiting example and with reference to the appended figures, in which.

DETAILED DESCRIPTION

Figure 1:
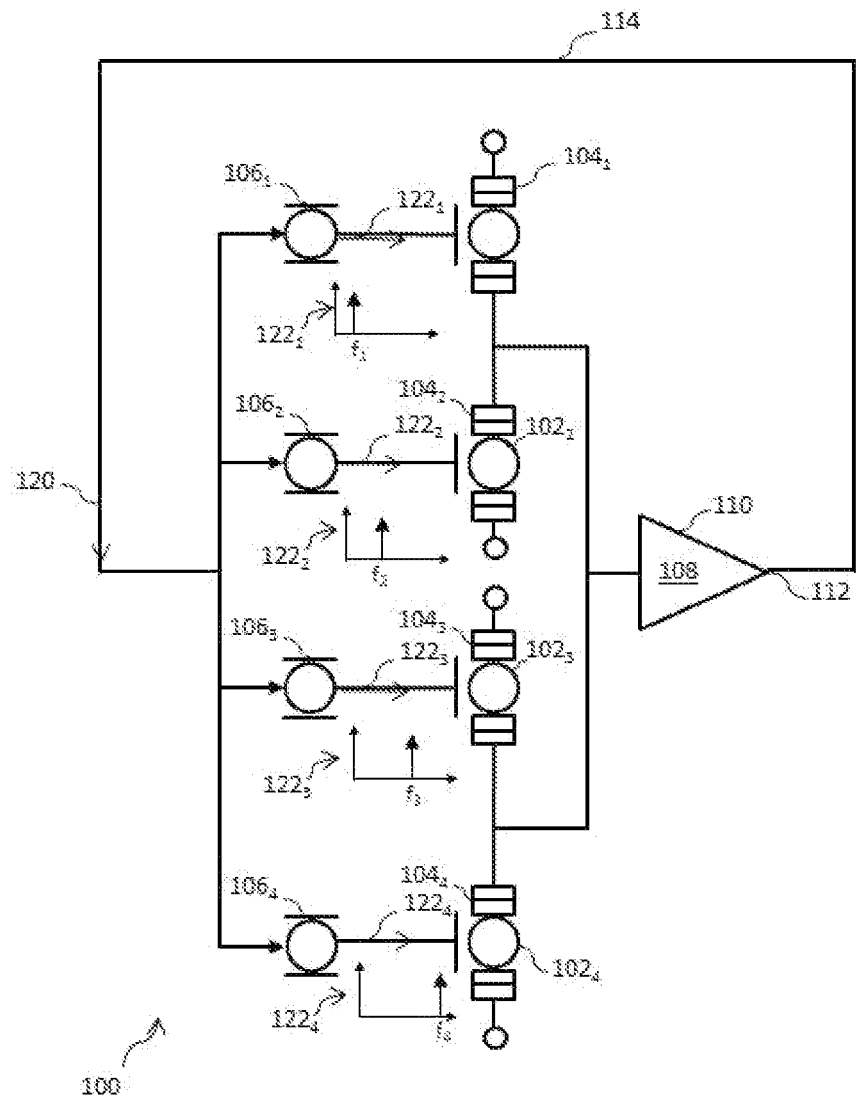
FIG. 1 schematically shows a first example of a device according to the invention.

FIG. 1 schematically shows a first example of a device 100. The device 100 is a quantum device 100 and comprises:

multiple spin qubits 102, each comprising at least one quantum dot, multiple electrometers 104, each being capacitively coupled to a potential well of the at least one quantum dot of at least one of the spin qubits 102, and multiple injection-locked oscillators 106, each being coupled to at least one electrode of one of the electrometers 104 and designed to transmit an oscillating signal 122, called an excitation signal 122, to at least one input electrode of the electrometer 104 to which it is coupled, each excitation signal 122 having a different frequency, an amplification circuit 108 comprising at least one amplifier 110, said amplification circuit 108 being coupled to the output of each electrometer 104 and comprising an output 112.

In this example, the device comprises in particular:

four spin qubits, each numbered $102_1$, $102_2$, $102_3$, $102_4$, four electrometers, respectively called first electrometer $104_1$, second electrometer $104_2$, third electrometer $104_3$ and fourth electrometer $104_4$, and four injection-locked oscillators 106, respectively called first injection-locked oscillator $106_1$, second injection-locked oscillator $106_2$, third injection-locked oscillator $106_3$, and fourth injection-locked oscillator $106_4$.

Of course, in other variants of device 100, the device 100 may comprise more or fewer of these components. For example, the device 100 may comprise between 2 and 10000 qubits.

The device 100 further comprises a feedback loop 114 coupling the output 112 of the amplification circuit 108 to an input 116 of each injection-locked oscillator 106 through which an electrical signal flows, called an injection signal 120 also denoted $I_{108}$. The injection signal 120 comprises components at the frequencies of said excitation signals 122.

In the device 100, each injection-locked oscillator 106 is arranged to receive the injection signal 120 and, as a function of said injection signal 120, keep its excitation signal 122 in a first operating state or decrease its excitation signal 122 to a second operating state. In the example illustrated in FIG. 1, the injection signal 120 relates to a current. In other variants, the injection signal may be a voltage. For further information on injection-locked oscillators, reference may be made to Yoon 2004 or to FR 3 089 724.

In the device 100 illustrated in FIG. 1, the amplification circuit 108 comprises just one amplifier 110. In the embodiment illustrated in FIG. 1, the amplifier may be a transimpedance amplifier, also denoted TIA, or the amplification circuit 108 is designed to perform current amplification.

In a non-limiting manner, the spin qubits of the device 100 may be spin qubits produced in a semiconductor layer, for example silicon or germanium. The charges of which the spin is to be read may correspond to electrons or to holes.

In addition, according to this exemplary embodiment, the electrometers 104 of the device 100 may comprise, and preferably be, single-electron transistors (SETs). In this case, each electrometer 104 of the device 100 may comprise a gate, a source and a drain. By way of example, the drain and gate of each electrometer 104 may form the input electrodes of the electrometers 104 while the sources of the electrometers 104 form the output electrodes of the electrometers 104. The sources of the electrometers 104 may be electrically connected to one another. Of course, in other embodiments which are not illustrated, the electrometers 104 may comprise or be quantum point contacts (QPCs).

In this example, each injection-locked oscillator 106 may be coupled to the gate of the corresponding electrometer 104. Thus, each excitation signal 122 is applied to that gate of the electrometer 104. In another variant, each injection-locked oscillator 106 may be coupled to the drain of the corresponding electrometer 104. The excitation signal sent to the drain of the electrometer may be more linear than a signal sent to the gate of the electrometer. Measurement precision may therefore be improved.

When the electrometers 104 are QPCs, the excitation signals 122 are applied by injection-locked oscillators 106 to the input electrode of each of the QPC-type electrometers 104, which may be the electrode to which a DC bias voltage is delivered.

In FIG. 1, the excitation signals 122 may each be sinusoidal signals all having different frequencies. The excitation signal 122 may relate to a current. In the example illustrated in FIG. 1, each injection-locked oscillator 106 produces an excitation signal 122 comprising at least one frequency and amplitude. The frequency of the excitation signal 122 is specific to each injection-locked oscillator 106 and the amplitude of the excitation signal 122 is dependent on the state of the spin qubit.

By way of example, the signal output from each injection-locked oscillator 106 may be denoted:

$$I_{106_i} = A_i \sin(2\pi f_i t)$$

where the subscript i corresponds to the number of the injection-locked oscillator 106 and $f_i$ corresponds to the frequency of the $i^{th}$ injection-locked oscillator 106, and $A_i$ is the amplitude of the corresponding excitation signal 122. In this example, the amplitude $A_i$ output from each electrometer 104 is dependent on the state of the spin qubit facing the corresponding electrometer 104. In a non-limiting manner, the excitation signal $122_1$ delivered by the first injection-locked oscillator $106_1$ may have a frequency $f_1$ equal to 10 MHz, the excitation signal $122_2$ delivered by the second injection-locked oscillator $106_2$ may have a frequency $f_2$ equal to 11 MHz, the excitation signal $122_3$ delivered by the third injection-locked oscillator $106_3$ may have a frequency $f_3$ equal to 13 MHz and the excitation signal $122_4$ delivered by the fourth injection-locked oscillator $106_4$ may have a frequency $f_4$ equal to 14 MHz. Thus, in FIG. 1, all of the excitation signals 122 comprise different frequencies. In addition, these frequencies are spaced far enough apart to avoid errors due to false alarms and/or non-detections. Typically the spacing between the frequencies may be of the order of 1 MHz, and more generally between 100 kHz and 10 MHz.

In the device 100, all of the signals output from the electrometers 104 are combined into a signal at the input of the amplification circuit 108. The signal at the input of the amplification circuit 108 is, according to Kirchhoff's first law, dependent on all of the signals from the various electrometers 104.

By way of example, the signal at the input of the amplification circuit 108 is expressed as $$I_{e,108} = \sum_{i=1}^{N} I_{106_i} = \sum_{i=1}^{N} A_i \sin(2\pi f_i t)$$

where N corresponds to the total number of electrometers 104 in the device 100 (in the case of FIG. 1, N is equal to 4), and the subscript e refers to the input of the amplification circuit 108. Thus, the signal at the input of the amplification circuit 108 is dependent on all of the excitation signals 122. The signal at the input of the amplification circuit 108 thus contains all of the components of all of the excitation signals 122 of the device 100. As such, the signal at the input of the amplification circuit 108 contains the information on the state of each spin qubit. In the example illustrated in FIG. 1, the signal at the input of the amplification circuit 108 is a spectrum that comprises a line associated with each excitation signal 122. Each line of the spectrum of the signal at the input of the amplification circuit 108 has an amplitude that is dependent on the corresponding spin state.

By way of example, the device 100 further comprises a cryostat including a chamber configured to be kept at a temperature lower than or equal to 4 kelvin (K) and in which at least the spin qubits, the electrometers 104, the injection-locked oscillators 106, and the amplification circuit 108 and, if required, bias circuits are arranged.

In the case of the device according to the invention, the information on the spin of each spin qubit is obtained by studying the excitation signal 122 output from each injection-locked oscillator 106. The injection signal 120 entering each injection-locked oscillator 106 carries information which is demultiplexed inside the locked oscillators 106 used for the initial excitation. Thus, the device 100 is based on the use of N electrometers 104, N injection-locked oscillators 106 and an amplification circuit 108 comprising, in the example illustrated, a single amplifier 110, used for reading N spin qubits, where N is an integer greater than 1. Such an arrangement also avoids the use of a multitude of demultiplexing chains which may be used to retrieve the information on the spin of each spin qubit (e.g. N demultiplexing chains) and which may be made up of multiple components such as analogue-to-digital converters and/or mixers, and/or integrators, and/or comparators. As such, the device according to the invention is less bulky and not using one or more demultiplexing chains makes it possible to limit the power consumption of each component and thus limit the power consumption of the device according to the invention.

Figure 2:
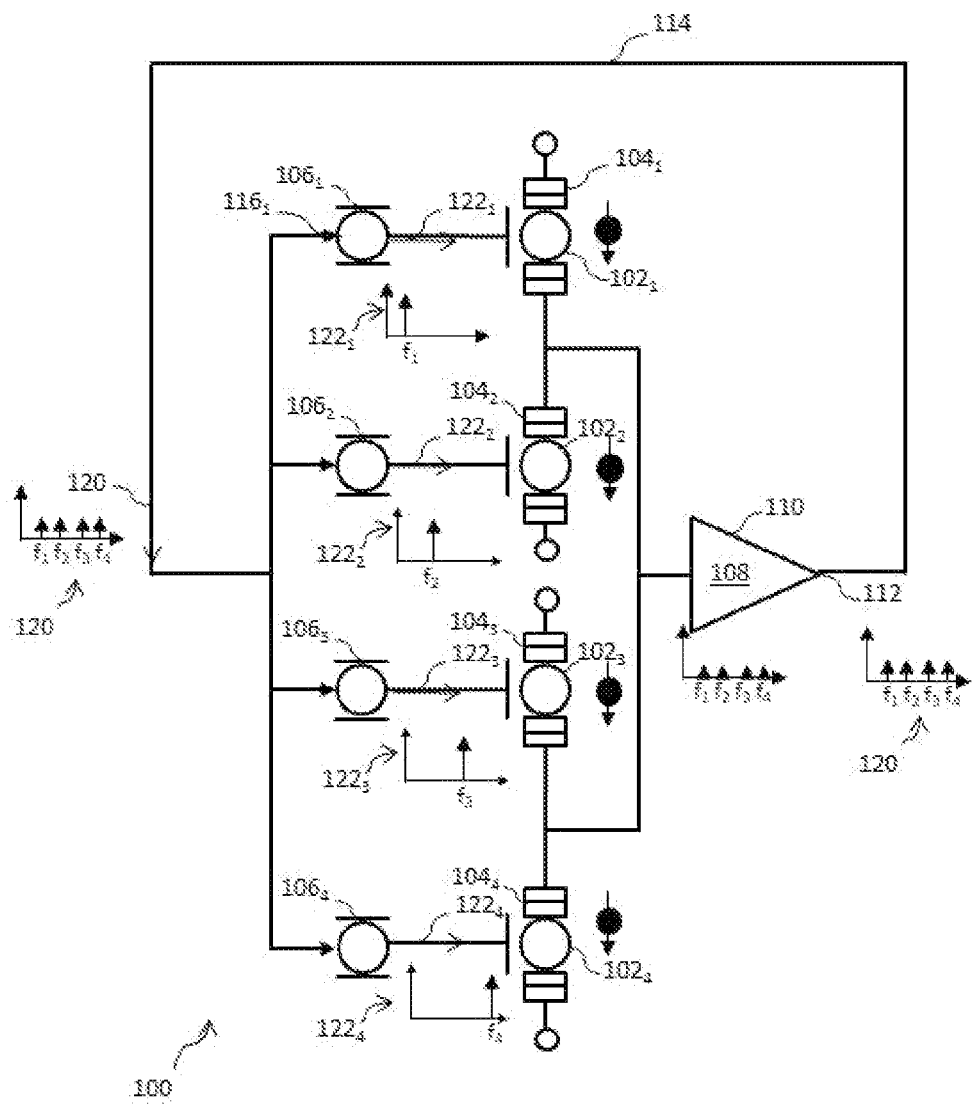
FIG. 2 schematically shows the first example of the device according to the invention when all of the spin qubits are in a low state.

FIG. 2 schematically shows the device 100 when all of the spin qubits of the device 100 are in the low state.

In the device 100, the conductance associated with each electrometer 104 varies as a function of the state of the spin qubit with which the electrometer 104 is coupled. By way of example, when the spin qubit is in the low state, the conductance of an electrometer 104 may be of the order of tens of nS (nanosiemens), corresponding to a current of the order of nA (nanoamperes), whereas the conductance of an electrometer 104, when the spin qubit is in the low state, may be of the order of tens of pS (picosiemens), corresponding to a current of the order of pA (picoamperes). The signal output from each electrometer is dependent on the state of the spin qubit.

By way of example, the excitation signal 122 flowing through an electrometer 104 may be of the order of pA if an electron in the quantum dot of the spin qubit has its spin oriented downwards, and of the order of nA if the electron in the quantum dot of the spin qubit has its spin oriented upwards.

The spin qubits illustrated in FIG. 1 are all in the low state. As such, the amplitudes associated with each spin qubit are of the order of picoamperes (pA) and therefore small with respect to the state of spin qubits in the high state which may be of the order of nA. Thus, the signal at the input of the amplification circuit 108 is of the order of pA.

The amplification circuit 108 is designed to amplify the signal at its input. In the example illustrated in FIG. 2, the amplification circuit is designed to perform negative amplification. Such a feature allows the operation of the second operating state of the injection-locked oscillators to be implemented in a simple manner. Thus, the injection signal 120 is proportional to the signal at the input of the amplifier circuit 108 and is phase-shifted by approximately 180° relative to the signal at the input of the amplifier circuit 108. In this example, the injection signal 120 is a spectrum that comprises a line associated with each excitation signal 122. Each line of the spectrum of the injection signal 120 has an amplitude that is dependent on the corresponding spin state. Thus, using a spectrum provides a simple representation suitable for processing of the injection signal by the injection-locked oscillators 106. In particular, this may limit errors due to false alarms and/or absence of detection. The device 100 is therefore more accurate.

The injection signal 120 output from the amplification circuit 108 traverses the feedback loop 114 in order to be injected into the various injection-locked oscillators 106 of the device 100. The signal injected into each injection-locked oscillator 106 is thus proportional to the injection signal 120.

Figure 3:
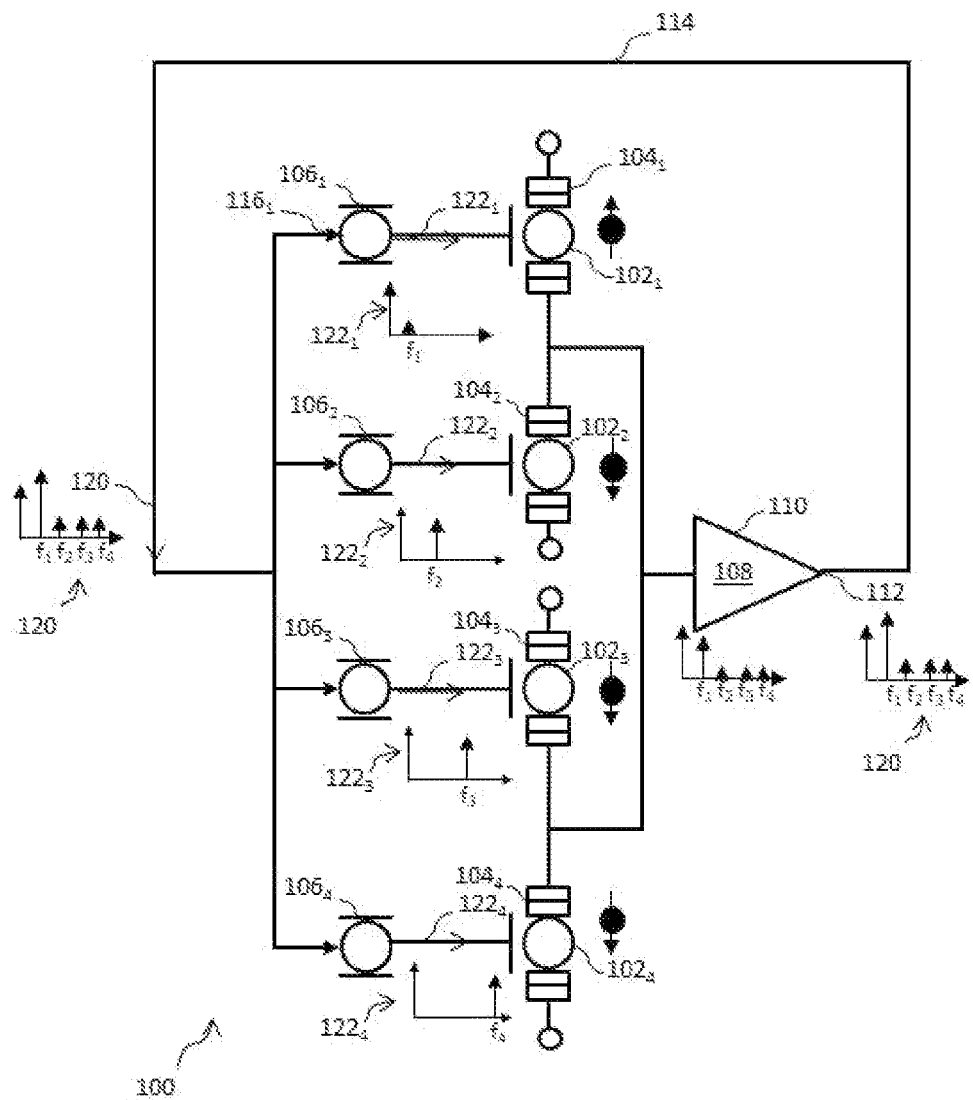
FIG. 3 schematically shows the first example of the device according to the invention when one of the spin qubits is in the high state.

FIG. 3 schematically shows the device 100 when one of the spin qubits of the device 100 transitions to the high state.

In the case of FIG. 3, the spin qubit numbered 1 is in the high state. By way of example, the signal output from the first electrometer $104_1$ is of the order of nA and therefore higher than the signals output from the other electrometers $104_2$, $104_3$, $104_4$ which are of the order of pA. Thus, in the signal at the input of the first amplification circuit 108, the first line at frequency $f_1$ comprises an amplitude that is greater than the lines at frequencies $f_2$, $f_3$ and $f_4$. The same goes for the injection signal 120 output from the amplification circuit 108.

In the example of FIG. 3, the signal reinjected into each injection-locked oscillator 106 contains all of the components of the injection signal 120. In this example, the amplitude of the injection signal 120 of the line at frequency $f_1$ is higher than or equal to a threshold. The first injection-locked oscillator $106_1$ switches to the second operating state. The excitation signal $122_1$ output from the first injection-locked oscillator $106_1$ operating in the second operating state is lower than the excitation signal $122_1$ from the first injection-locked oscillator $106_1$ operating in the first operating state. The threshold that causes the oscillator $106_1$ to switch from its first to its second operating state depends on the topology of the oscillator, on its biasing point, and on whether it operates with voltage or current injection. For example, in the case of current injection, the threshold may be between 0.1 times and 1 times the oscillator biasing current.

Conversely, the amplitudes of the injection signal 120 at the lines at respective frequencies $f_2$, $f_3$ et $f_4$ are lower than the thresholds defined using the excitation signal 122 transmitted by the second, third and fourth injection-locked oscillators $106_2$, $106_3$, $106_4$ when they are in their first operating state. As such, the second, third and fourth injection-locked oscillators $106_2$, $106_3$ et $106_4$ stay in their first operating states. Their associated excitation signals 122 are therefore maintained; they are not decreased. Although the injection signal 120 comprises lines at the various frequencies $f_1$, $f_2$, $f_3$ et $f_4$, the injection signal 120 at frequency $f_1$ does not intervene in the operation of the second, third and fourth excitation means $106_2$, $106_3$, $106_4$.

These features promote the "filtering" behaviour of the injection-locked oscillators of the device according to the invention, which allows either the "initial" excitation signal, i.e. the excitation signal initially transmitted by each injection-locked oscillator, to be maintained, or the transmission of the excitation signal to be decreased or even halted.

Figure 4:
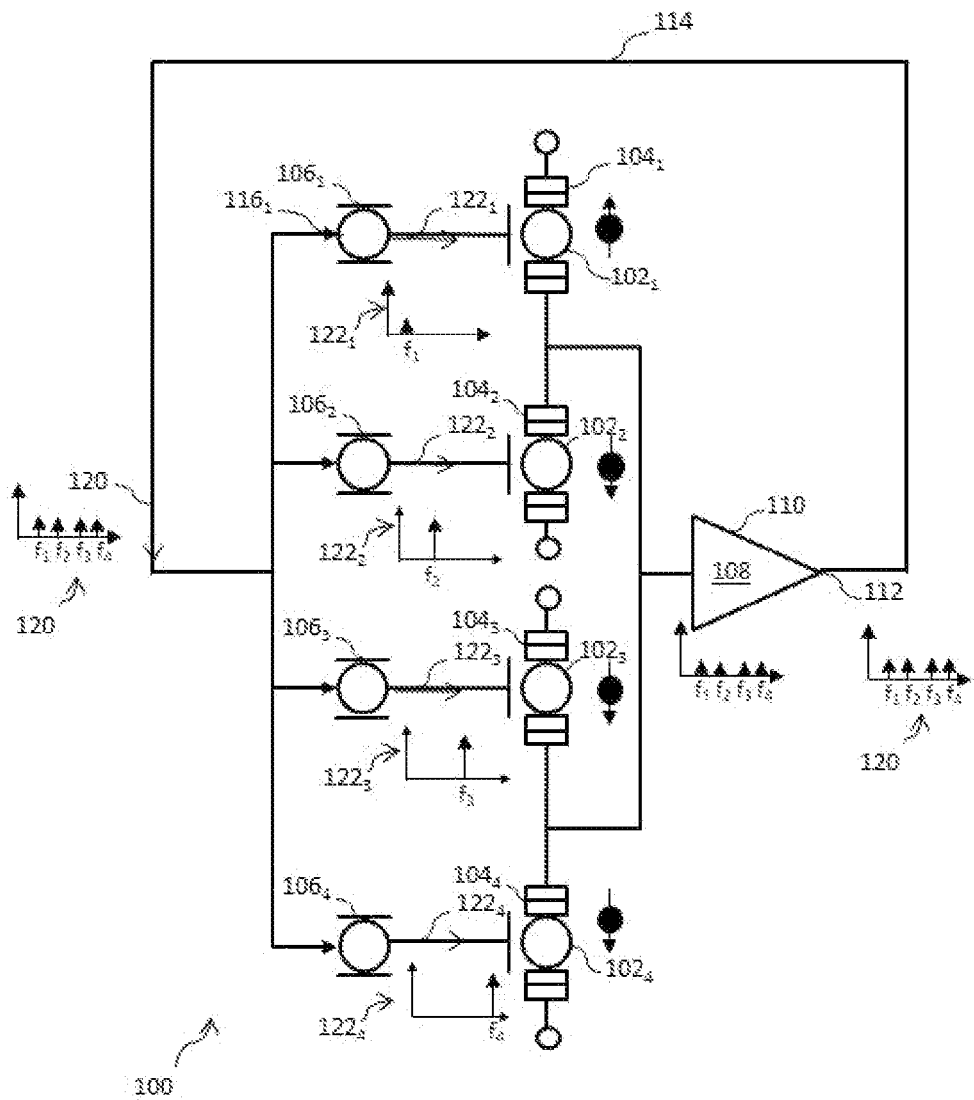
FIG. 4 schematically shows the first example of the device according to the invention when the measurement means associated with the spin qubit in the high state is in a second operating state.

FIG. 4 schematically shows the device 100 when the first injection-locked oscillator $106_1$ is operating in its second operating state. The signal transmitted by the oscillator is a voltage signal, the gate impedance of the electrometer being practically infinite.

Figure 5:
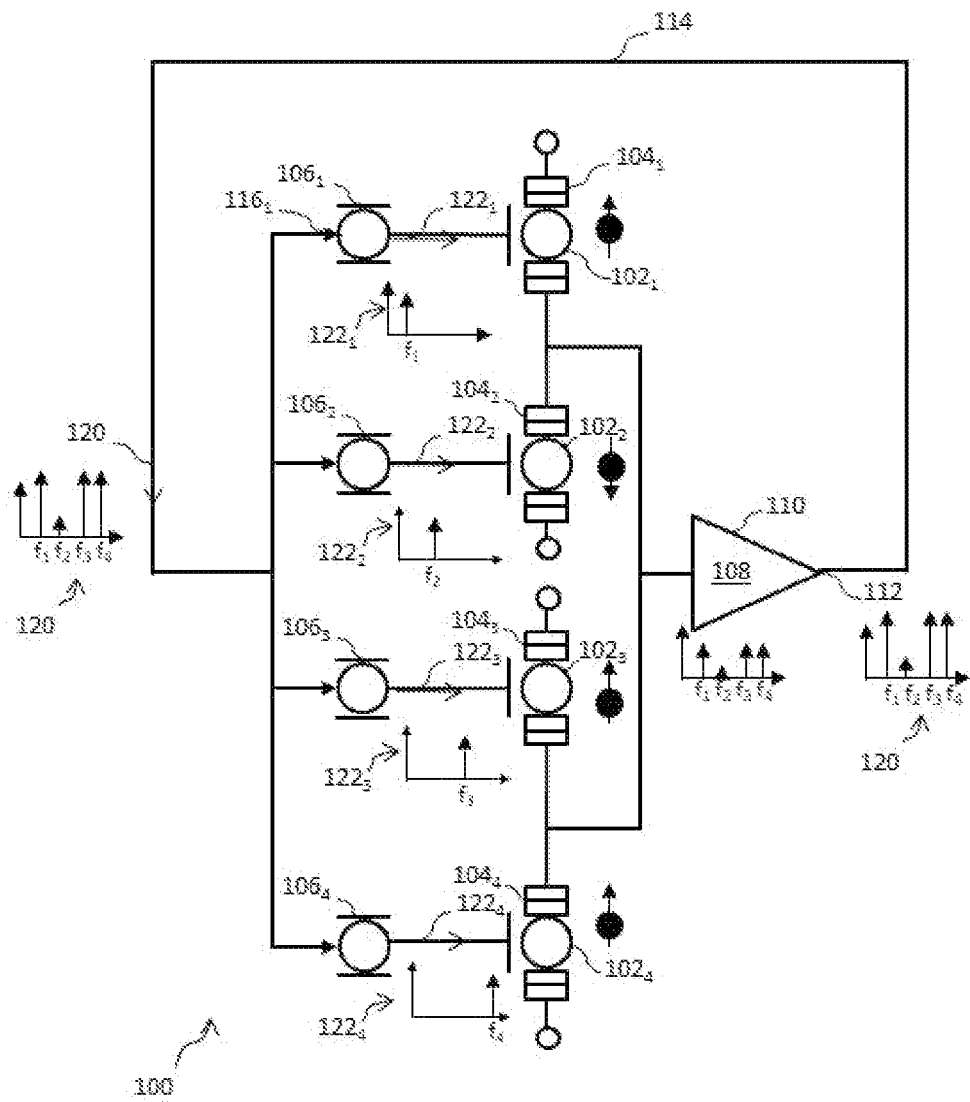
FIG. 5 schematically shows a first example of the device according to the invention when three spin qubits are in the high state.

FIG. 5 schematically shows the device 100 when three spin qubits of the device 100 are in the high state.

In the example illustrated in FIG. 5, the first, third and fourth spin qubits are in the high state. For example, the conductance associated with the second electrometer $104_2$ is of the order of ten nS whereas those of the first, third and fourth electrometers $104_1$, $104_3$, $104_4$ are of the order of ten pS.

In this example, the signal output from the second electrometer $104_2$ may be ignored. The signal at the input of the amplification circuit 108 may thus be simplified and expressed according to the following formula:

$$I_{e,108} = \sum_{i=1}^{4} I_{106_i} \approx A_1\sin(2\pi f_1 t) + A_3\sin(2\pi f_3 t) + A_4\sin(2\pi f_4 t)$$

The injection signal 120 output from the amplification circuit 108 may thus be expressed as follows:

$$I_{108} \approx -AA_1 \sin(2\pi f_1 t) - AA_3 \sin(2\pi f_3 t) - AA_4 \sin(2\pi f_4 t)$$

where A corresponds to the amplification factor of the amplification circuit 108.

In this example, the injection signal 120 contains the frequency components corresponding to the electrometers 104 for which the associated qubit is in the high state. In this example, the signal reinjected into the first, third and fourth injection-locked oscillators $106_1$, $106_3$, $106_4$ is proportional to the injection signal 120 and thus comprises lines with amplitudes of the same order of magnitude. The first, third and fourth injection-locked oscillators $106_1$, $106_3$, $106_4$ will thus switch to their second operating state, which brings about a substantial decrease in the excitation signal 122 output from these injection-locked oscillators $106_1$, $106_3$, $106_4$. Conversely, the signal injected into the second injection-locked oscillator $106_2$ does not contain any, or hardly any, component at the frequency $f_2$. As such, the second injection-locked oscillator $106_2$ stays in its first operating state. The excitation signal from the second injection-locked oscillator $106_2$ is thus maintained, i.e. it is not decreased. As such, the excitation signal $122_2$ from the second injection-locked oscillator $106_2$ oscillates at the same amplitude.

Figure 6:
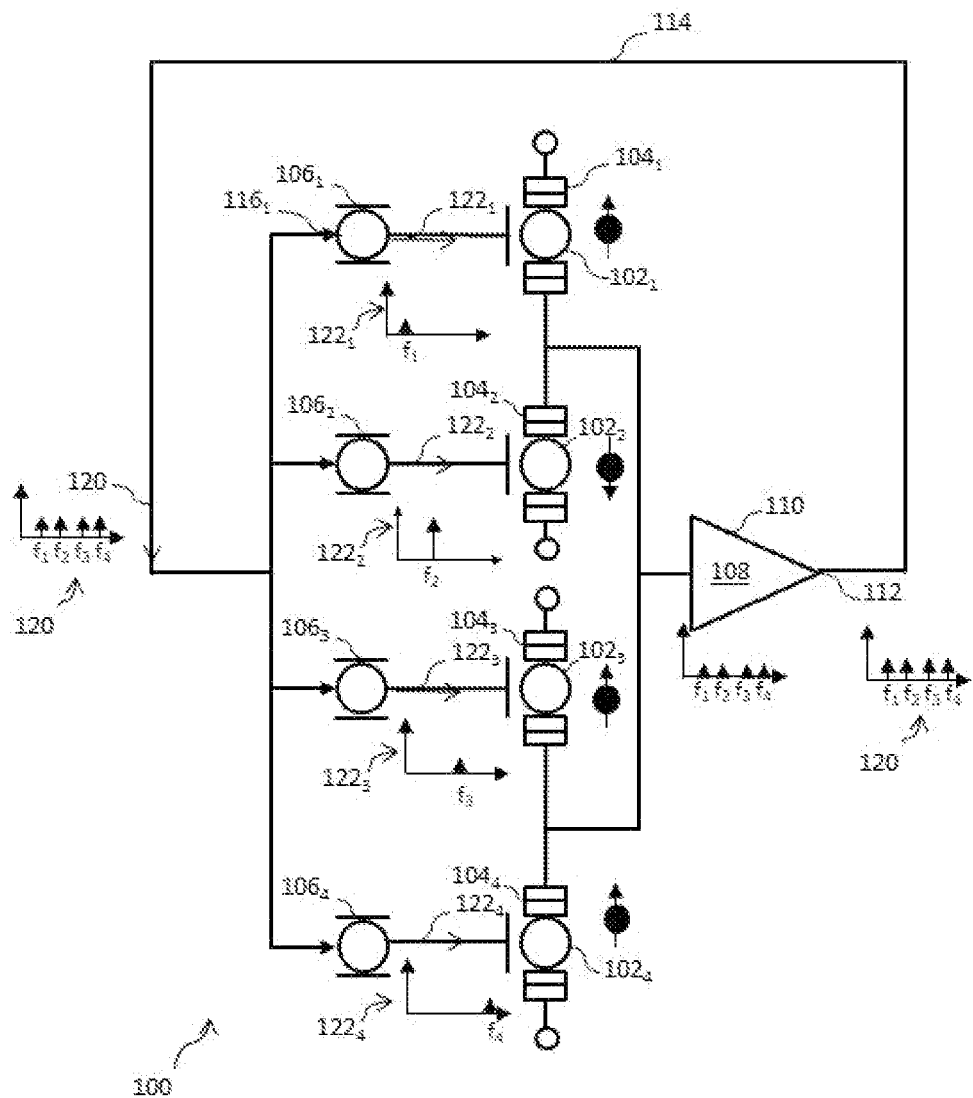
FIG. 6 schematically shows the first example of the device according to the invention when the measurement means associated with the spin qubits in the high state are in a second operating state.

FIG. 6 schematically shows the behaviour of the first, third and fourth injection-locked oscillators $106_1$, $106_3$, $106_4$ of the device 100 after three spin qubits of the device 100 have transitioned to the high state.

In this example, the first, third and fourth excitation means $106_1$, $106_3$, $106_4$ have switched to the second operating mode.

Figure 7:
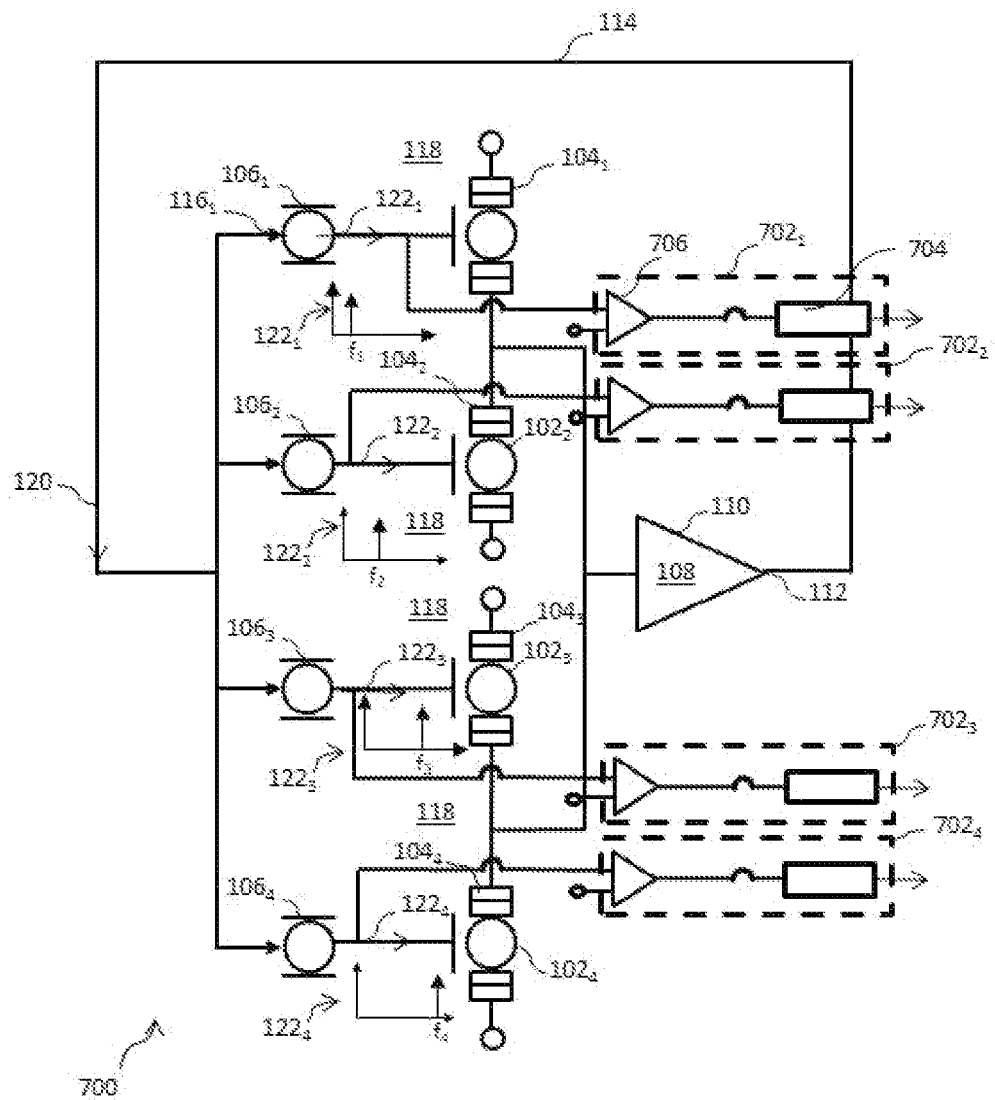
FIG. 7 schematically shows a second example of a device according to the invention.

FIG. 7 is a second example of a device 700 according to the invention.

The device 700 illustrated in FIG. 7 comprises all of the elements of the device 100. Thus, only the differences will be described.

The device 700 further comprises multiple measurement means 702, respectively numbered $702_1$, $702_2$, $702_3$ et $702_4$, each being coupled with an injection-locked oscillator 106. Each measurement means 702 is designed to detect the operating state of the injection-locked oscillator 106 to which it is coupled and, depending on the detected state, to transmit a signal, called a measurement signal, relating to a spin state. Thus, studying the injection signal 122 transmitted by each injection-locked oscillator 106 provides information on the state of the corresponding spin qubit. As such, in the device according to the invention, the spin qubits may be read directly by analysing the excitation signals 122, thereby allowing the compactness, and low power consumption, of the device according to the invention to be improved even further. In addition, this makes its implementation simpler because the processing of the information is made easier.

By way of non-limiting example, each measurement means 702 comprises an analogue comparator 704 connected by its input to the output of one of the injection-locked oscillators 106 and coupled by its output to a digital processing means 706. The analogue comparator 704 is designed to detect the operating mode of the injection-locked oscillator 106, i.e. the first operating state or the second operating state of the injection-locked oscillator 106 to which it is connected. For example, each analogue comparator 704 continuously records the excitation signal 122 from the corresponding injection-locked oscillator 106 and transmits a signal that varies according to the excitation signal 122. In the example illustrated in FIG. 7, the negative input of the analogue comparator 704 is set to a potential and the positive input of the analogue comparator 704 is set to the output of the corresponding injection-locked oscillator 106.

For a given measurement means 702, when the oscillator 106 is operating in its first operating state, for example when no significant decrease in the excitation signal 122 is registered by the analogue comparator 704, then the output of the excitation signal 122 from the injection-locked oscillator 106 successively rises above and then falls below the potential of the negative input of the analogue comparator 704. The output of the analogue comparator 704 may thus be a square-wave signal with a frequency equal to that of the injection-locked oscillator 106.

When the injection-locked oscillator 106 is operating in its second operating state, for example when a significant decrease in the excitation signal 122 is recorded by the comparator 704, then the excitation signal 122 never goes above or below the potential of the negative input of the analogue comparator 704. The signal output by the analogue comparator 704 is thus a constant signal.

The signal transmitted by the analogue comparator 704 is transmitted to the digital processing means 706 which will output a digital signal with two possible states, 0 or 1, representing the spin state of the corresponding spin qubit. By way of example, the state 0 may represent a low spin state while the state 1 may represent a high spin state.

Alternatively, the circuit illustrated in FIG. 7 may comprise multiple bias circuits 118 (schematic illustration), each being coupled to an electrometer 104 and arranged to apply a DC bias voltage to said electrometer 104 which is designed so that each electrometer 104 produces a Coulomb blockade. In this example, the DC bias voltage may be applied to the input electrode of each electrometer 104, for example to the drain and gate of each electrometer. In this example, all of the electrometers 104 are biased with DC bias voltages of the same value. The bias circuits 118 may also be implemented on the device 100.

Preferably, the electrometers 104 are biased so as to obtain a substantial difference in conductance within the electrometers 104 depending on the spin orientation of the charges in the spin qubits, which will result in output signals of different amplitudes depending on the spin orientation of the charges. For example, the current flowing through an electrometer 104 may be of the order of pA if an electron in the quantum dot of the spin qubit has its spin oriented downwards, and of the order of nA if the electron in the quantum dot of the spin qubit has its spin oriented upwards.

Figure 8:
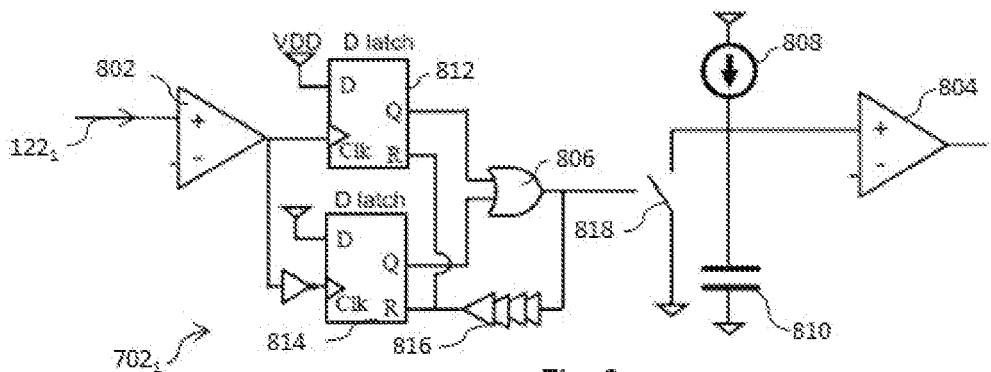
FIG. 8 is one example of measurement means used in a device according to the invention.

FIG. 8 illustrates a second example of measurement means 702 that may be implemented in the device 100 or 700. This example focuses on the measurement means associated with the first injection-locked oscillator $106_1$. Of course, the measurement means 702 illustrated in FIG. 2 may be coupled to any injection-locked oscillator 106 of the device 100 or 700 according to the invention. The measurement means 702 associated with each injection-locked oscillator 106 may be similar or different.

In this example, the signal $122_1$ is transmitted by the first injection-locked oscillator $106_1$. The measurement means 702 comprises a first comparator 802 and a second comparator 804, an OR gate 806, a current source system 808 and a capacitor 810. The measurement means illustrated in FIG. 8 also comprises two latch devices, respectively denoted 812 and 814, known as a "D latch" system. The measurement means illustrated in FIG. 8 also comprises a delay line 816 and a CMOS switch 818. The second comparator 804 is designed to output a signal that alternately comprises two states, a low state 0 and a high state 1. The current source 808 is arranged to supply the capacitor 810 with DC.

When the first injection-locked oscillator $106_1$ is in its first operating state, i.e. when the injection signal $122_1$ is maintained, then the first comparator 802 transmits an oscillating signal as its output. At each rising or falling edge of this signal, the flip-flops 812 (for rising edges) and 814 (for falling edges) close the switch 818 for a time determined by the delay line 816 (the OR gate 806 allows the driver signals from the latches to be combined). The voltage across the terminals of the capacitor therefore cannot increase, and the output of the comparator 804 remains at a low level. If, however, the first injection-locked oscillator $106_1$ is in its second operating state, the amplitude of the injection signal $122_1$ has a lower value, which does not allow the first comparator 802 to switch. The output of the switch 810 therefore remains at a low level, and the switch 818 remains in its open state. Under these conditions, the voltage across the terminals of the capacitor 810 increases linearly until causing the output of the comparator 804 to switch to its high level.

Figure 9:
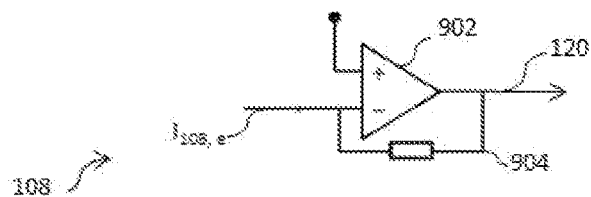
FIG. 9 is one example of an amplification circuit used in a device according to the invention.

FIG. 9 illustrates one example of an amplification circuit 108 that may be implemented in the device 100 or the device 700.

In the example illustrated in FIG. 9, the amplification circuit 108 may comprise an amplifier 902 comprising a resistive feedback 904. The amplification circuit 108 illustrated in FIG. 9 is a transimpedance amplifier. The resistive feedback 904 is designed to convert the signal at the input of the amplification circuit 108 into an injection signal 120 relating to a voltage. In the case illustrated in FIG. 9, the gain of the amplification circuit 108 is proportional to the resistance present in the resistive feedback 904. By way of non-limiting example, the gain of the amplification circuit 108 illustrated in FIG. 9 is of the order of MΩ. The amplification circuit 108 may comprise a bandwidth between 10-30 MΩ, a gain of 10 MΩ, an input noise of the order of 10 fA/sqrt(Hz) and a consumption of the order of a hundred microwatts. In the device 100 or 700, the bandwidth of the amplification circuit 108 is chosen so that all of the frequencies of all of the excitation signals 122 are within this bandwidth.

Of course, other arrangements may be implemented in the device according to the invention, such as those described in L. Le. Guevel 2020.

Figure 10:
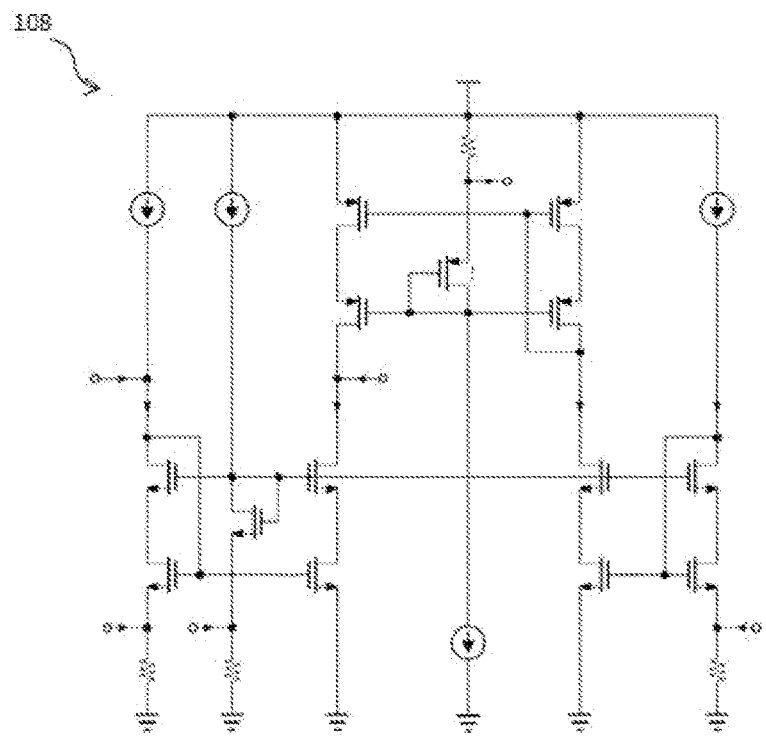
FIG. 10 is another example of measurement means used in a device according to the invention.

FIG. 10 illustrates another example of an amplification circuit 108 that may be implemented in the device 100 or the device 700.

The amplification circuit illustrated in FIG. 100 is designed to perform current amplification. Thus, in this example, the injection signal 122 relates to a current. In this case, the feedback loop 114 of the device 100 or 700 is connected to a current input port of each injection-locked oscillator 106.

The amplification circuit 108 illustrated in FIG. 10 is produced with the features described in document Bonteanu 2017.

Figure 11:
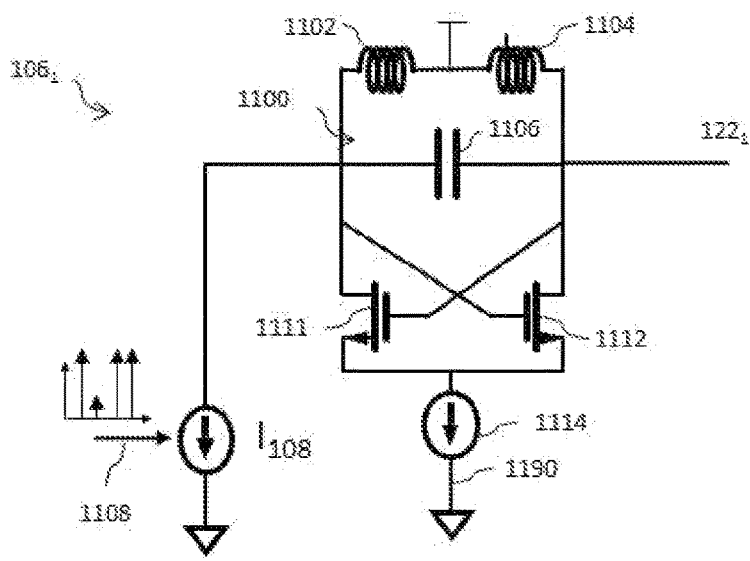
FIG. 11 is one example of an injection-locked oscillator used in a device according to the invention.

FIG. 11 illustrates one example of an injection-locked oscillator 106. The injection-locked oscillator 106 illustrated in FIG. 6 is, by way of example, the first injection-locked oscillator $106_1$. The injection-locked oscillator $106_1$ illustrated in FIG. 11 comprises an LC-type architecture, referred to as a cross-coupled differential topology with an NMOS pair and a tail-current at the source. The injection-locked oscillator comprises a resonant circuit 1100 known as a tank LC. The resonant circuit comprises two inductances 1102 and 1104, a capacitor 1106, two transistors CMOS 1111 and 1112 and a current source 1114 for generating a bias current 1190. The gate of the transistor 1111 is connected to the drain of the transistor 1112 and vice versa, and the drains of both transistors are connected to the resonant circuit 1100. In this type of architecture, the excitation signal 122 transmitted by the injection-locked oscillator 106 thus exhibits damping due to energy losses in the inductances 1102 et 110 and the capacitor 1106. To compensate for this damping, the NMOS transistors 1111 and 1112 and the current source 1114 act as a "negative resistance" which allows energy to be injected into the injection-locked oscillator $106_1$ and keep it in an undamped oscillating state. The energy injected by the transistors 1111 and 1112 and the current source 1114 compensate for the resistive losses in the resonant circuit 1100.

The excitation signal $122_1$ transmitted by the injection-locked oscillator $106_1$ illustrated in FIG. 11 comprises a frequency that is expressed according to the formula:

$$f_i = \frac{1}{2\pi}\sqrt{\frac{1}{LC}}$$

where L corresponds to the total inductance of the resonant circuit 1110 and C is the total capacitance of the resonant circuit 1100. Such an arrangement promotes the oscillation frequency specific to each injection-locked oscillator 106 and makes adjusting this frequency simpler.

Thus, according to this arrangement, the excitation signal 122 illustrated in FIG. 11 comprises a natural oscillation frequency $f_i$.

The oscillation frequency of the injection-locked oscillator $106_1$ may be adjusted capacitively. This facilitates adapting and/or modifying the frequency of each excitation signal 122 whether for choosing its value or for potentially modifying this value. In addition, the oscillation frequency of the injection signal $122_1$ transmitted by the injection-locked oscillator $106_1$ is dependent on the total capacitance of the resonant circuit 1100 and the total inductance of the resonant circuit 1100. Thus, the oscillation frequency $f_i$ may easily be adjusted and/or modified by modifying the total inductance and/or the total capacitance of the resonant circuit 1100. The oscillation frequency of each injection-locked oscillator 106 may be adjusted capacitively. For example, the first injection-locked oscillator $106_1$ may comprise a total capacitance equal to $C_1=C_{ref}$ (typically between 10 fF (femtofarads) and 1 pF (picofarads) depending the desired oscillation frequency), the second injection-locked oscillator $106_2$ may comprise a total capacitance equal to $C_2=2^2C_{ref}=4C_{ref}$, the third injection-locked oscillator $106_3$ may comprise a total capacitance equal to $C_3=2^3C_{ref}=8C_{ref}$, and the fourth injection-locked oscillator $106_4$ may comprise a total capacitance equal to $C_4=2^4C_{ref}=16\ C_{ref}$. The value of the total capacitance of each injection-locked oscillator 106 may be programmable. For example, the device 100 or 700 may comprise a plurality of switches coupled to a memory which is designed to adjust the total capacitance of each injection-locked oscillator 106. Thus, the capacitance of each injection-locked oscillator 106 may be adjusted more precisely.

The injection-locked oscillator $106_1$ illustrated in FIG. 11 comprises an input port 1108 which may be a current input port or a voltage input port. In case where the port 1108 is a voltage input port, an output voltage from the amplifier 110 drives the current source $I_{108}$ with a certain transconductance gain. If, however, the port 1108 is a current input port, an output current from the amplifier 110 is copied (with, where applicable, a gain) by the current source $I_{108}$. Thus, the injection signal may be a voltage or a current, thereby providing an injection-locked oscillator that is easy to implement in the device according to the invention. In the case of using the current input port, the injection-locked oscillator $106_1$ in this example may be coupled to the amplification circuit 108 illustrated in FIG. 10. In the case where the injection signal 120 relates to a voltage, for example when the amplification circuit 108 contains a resistive feedback as illustrated in FIG. 9, the amplification circuit 108 may be coupled with a transconductance amplification stage, for example, a MOS transistor designed to convert an input voltage on the gate of the MOS transistor into a drain-source current.

In the example illustrated, when the injection signal 120 (here relating to a current) does not contain any line at the frequency of the injection-locked oscillator $106_1$, the injection signal 120 has no effect on the dynamic range of the injection-locked oscillator $106_1$. As such, the excitation signal $122_1$ transmitted by the injection-locked oscillator $106_1$ is not modified. This is because the injection signal 120 is filtered by the LC resonant circuit.

The simplified transfer function linking the output voltage of the injection-locked oscillator $106_1$ to the injection signal 120 may be expressed according to the following formula:

$$|H| = \left|\frac{V_{106}}{I_{108}}\right| = \left|\frac{j\frac{L}{2}\omega}{1-\left(\frac{w_0}{w}\right)^2}\right| = \frac{L}{2}\omega \left|\frac{\frac{w^2}{w_0}}{1-\left(\frac{w}{w_0}\right)^2}\right|$$

where $I_{108}$ corresponds to the injection signal 120 relating to a current and $V_{106}$ corresponds to the output voltage of the injection-locked oscillator $106_1$. Thus, in the example illustrated, the transfer function is minimal when $w=w_0$. As explained above with reference to FIG. 9, when the amplitude of the injection signal 120, at the corresponding line, is lower than a threshold, the injection-locked oscillator $106_1$ operates in its first operating state. The excitation signal $122_1$ from the injection-locked oscillator $106_1$ is not modified.

When the amplitude of the injection signal 120, at the corresponding line, is higher than or equal to the threshold, the injection-locked oscillator $106_1$ switches to its second operating state. The excitation signal $122_1$ decreases. Specifically, in the example illustrated in FIG. 11, the transfer function increases and therefore the effect of the injection signal 120 on the dynamic range of the injection-locked oscillator $106_1$ illustrated by the preceding equation is no longer negligible. The injection signal $122_1$ opposes the operation of the injection-locked oscillator $106_1$. The excitation signal $122_1$ transmitted by the injection-locked oscillator $106_1$ operating in its first operating state has an amplitude that is typically at least 10 times greater than that of the excitation signal 122 transmitted by the injection-locked oscillator $106_1$ operating in its second operating state. By way of example, the amplitude of the excitation signal $122_1$ transmitted by the injection-locked oscillator $106_1$ when it is operating in its first operating state may be of the order of a few hundreds of mV whereas when it is in its second operating state, the signal transmitted by the injection-locked oscillator $106_1$ may be of the order of a few tens of mV. The excitation signal $122_1$ transmitted by the injection-locked oscillator $106_1$ operating in its second operating state has an amplitude that is dependent on the injection signal 120 and on the bias current of the injection-locked oscillator $106_1$ when it is in its first operating state. This allows the value of the decrease in the injection-locked oscillators operating in their second operating state to be adjusted. As such, the decrease in the injection signal may be small, and so the excitation signal may continue to excite the corresponding electrometer. Conversely, the decrease may be large, which may result in the transmission of an excitation signal that does not excite the corresponding electrometer, and may also result in the injection-locked oscillator stopping.

Of course, the arrangement of the injection-locked oscillator $106_1$ is not limited to this example. Other arrangements of the injection-locked oscillator 106 are applicable to the operation of the injection-locked oscillators 106 used in the device according to the invention. For example, the injection-locked oscillator $106_1$ may comprise an LC structure such as an NMOS pair and tail current at the drain, a PMOS pair and tail current at the source, or a PMOS pair and tail current at the drain, or more complex LC architectures such as, for example, CMOS core cross-coupled differential topologies.

In the devices 100 or 700, the injection-locked oscillators 106 may all be the same, for example they may all have the arrangement described in FIG. 11, or they may comprise a different arrangement from one oscillator to another.

Figure 12:
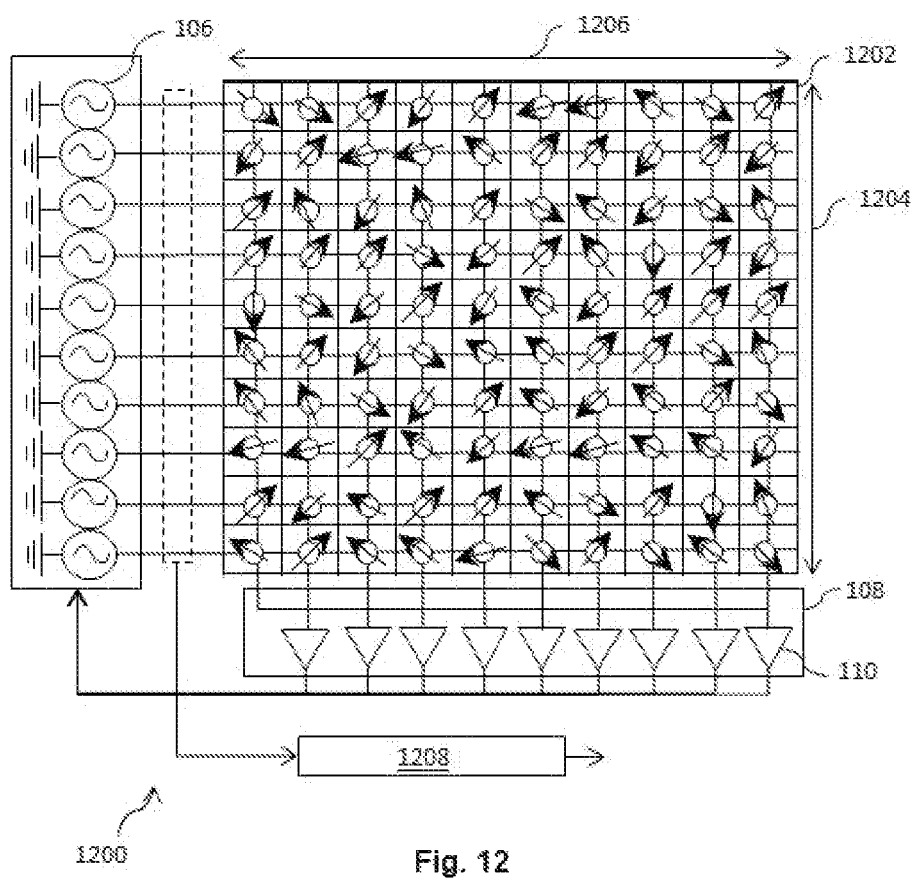
FIG. 12 schematically shows a third example of a device according to the invention.

FIG. 12 is another example of a quantum device 1200 according to the invention.

In the device illustrated in FIG. 12, the spin qubits are arranged in a spin qubit array 1202 comprising n rows in a first direction 1204 and m columns in a second direction 1206.

In the device 1200, the electrometers 104 are arranged in the form of an array (not illustrated) positioned facing the spin qubit array 1202 so that the at least one quantum dot of each spin qubit is capacitively coupled to a quantum dot of one of the electrometers 104.

In the example illustrated in FIG. 12, the array of spin qubits comprises n rows and m columns where n et m are integers greater than or equal to 1 and may be equal or different. The array of electrometers 104 is arranged above or below the array of spin qubits 1202 such that the quantum dot of each of the spin qubits is capacitively coupled to a quantum dot of one of the electrometers 104 located close by, above or below, the quantum dot of each of the spin qubits. In this example, the array of electrometers comprises n rows and m columns.

The parameters n and m may take values that are typically between 10 and 1000. By way of example, the values of n and m may be 100.

The array of spin qubits 1202 and the array of electrometers may be produced in a superposed manner via the implementation of a 3D integration method.

In the example illustrated in FIG. 12, the device 1200 in this embodiment comprises n excitation means 106 arranged in the first direction. Each injection-locked oscillator 106 is coupled to all of the electrometers 104 coupled to spin qubits positioned on one and the same row of the spin qubit array 1202. All of the electrometers 104 arranged on one and the same row of the array of spin qubits 1202 are coupled to one and the same injection-locked oscillator 106 so that one and the same excitation signal 122 is applied to at least one input electrode of the electrometers 104 present on one and the same row of the array of electrometers.

In the device 1200, the amplification circuit 108 also comprises m amplifiers 110 arranged in the second direction. Each amplifier 110 is coupled to all of the electrometers 104 coupled to spin qubits positioned on one and the same column of the spin qubit array 1202, the output of each amplifier 110 being coupled to the input of the injection-locked oscillator 106. In this way, all of the output signals delivered by the electrometers on one and the same column of the array of electrometers are summed before being sent to the corresponding amplifier 110.

Thus, each column of the array of spin qubits 1202 (coupled to the electrometers) associated with an injection-locked oscillator 106 and an amplifier 110 of the amplification circuit corresponds to the device 100. The operation of the device 1200 is therefore similar to that of the device 100.

The device 1200 also comprises m switches arranged in the second direction and positioned upstream or, preferably, downstream of the amplification circuit 108. Each switch is arranged so as to alternately connect all of the electrometers 104 coupled to spin qubits positioned on one and the same column of the spin qubit array 1202 to the corresponding amplifier 110 or to the corresponding injection-locked oscillator 106.

The device 1200 may also comprise bias circuits coupled to each electrometer 104.

In addition, the device 1200 also comprises measurement means 1208 coupled to the output of each injection-locked oscillator 106.

Figure 13:
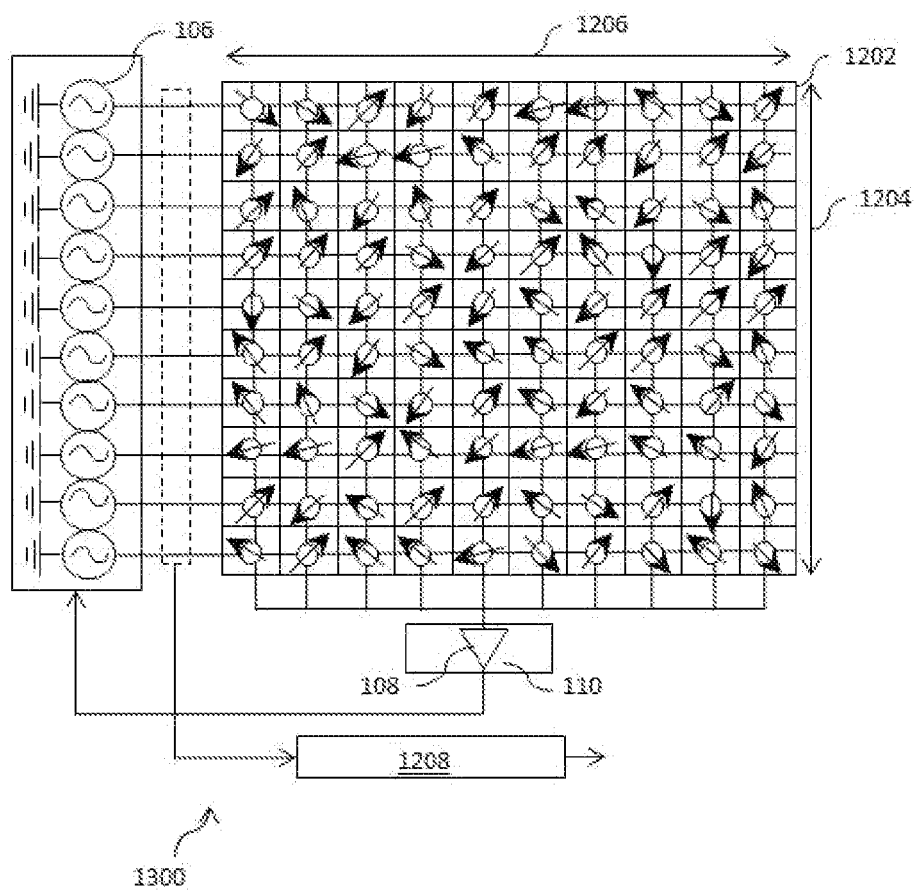
FIG. 13 schematically shows a fourth example of a device according to the invention.

FIG. 13 is another example of a quantum device 1300 according to the invention. The device 1300 comprises all of the elements of the device 1200. Only the differences with respect to FIG. 12 will be described.

The amplification circuit 108 comprises just one amplifier 110. The device 1300 further comprises m switches (not illustrated) arranged in the second direction, each switch being arranged so as to alternately connect all of the electrometers 104 coupled to spin qubits positioned on one and the same column of the spin qubit array 1202 to the amplifier 110.

According to the variants of the devices 1200 and 1300, the device may read an array of spin qubits that may comprise several thousand spin qubits. The device's power consumption is decreased and its compactness is increased in comparison with a device that does not participate in the readout of an array of spin qubits. The switches of these devices are arranged to perform a sequential readout of the array of spin qubits 1202. In particular, the readout is performed column by column of the array of spin qubits 1202.

The variant described according to device 1300 may be favoured because it does not require the use of an amplifier in the amplification circuit for the whole array of spin qubits. As such, this version requires fewer electronic components (fewer amplifiers in this case), which improves compactness and decreases power consumption.

According to variants of the devices 1200 and 1300, the array of electrometers 104 comprises fewer electrometers than spin qubits in the array of spin qubits 1202. In this case, the devices 1200 and 1300 may comprise a processing unit designed to retrieve, by triangulation, the state of each spin qubit from a signal transmitted by each electrometer 104. The processing unit may comprise a computer and/or a processor and/or a computing module.

Figure 14:
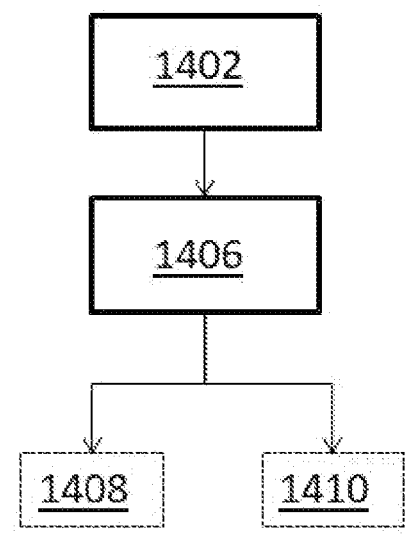
FIG. 14 schematically shows a first example of a method according to the invention.

FIG. 14 schematically shows a first example of a method 1400 according to the invention. The method 1400 is a method for reading multiple spin qubits 102, each comprising a quantum dot. The method 1400 is designed to implement any of the devices 100, 700, 1200 and 1300.

The method 1400 illustrated in FIG. 14 uses the electrometers 104, each being capacitively coupled to a potential well of the at least one quantum dot of at least one of the spin qubits 102, the injection-locked oscillators 106, each being coupled to at least one electrode of one of the electrometers 104, the amplification circuit 108, said amplification circuit 108 being coupled to the output of each electrometer 104 and comprising at least one amplifier 110 and an output 112, said method comprising:

each of the injection-locked oscillators 106 transmitting 1402 the excitation signal 122 to at least one input electrode of the electrometer 104 to which it is coupled, each excitation signal 122 having a different frequency, characterized in that said method 1400 further comprises:

injecting 1406 the injection signal 120 into each injection-locked oscillator 106 via a feedback loop 114 coupling the output 112 of said amplification circuit 108 to the input of each injection-locked oscillator 106, the injection signal 120 comprising components at the frequencies of said excitation signals 122 and, for each injection-locked oscillator 106, decreasing 1408 or maintaining 1410 the excitation signal 122 as a function of said injection signal.

The method according to the invention provides a solution for reading multiple spin qubits that is straightforward to implement and designed so as to use the fewest possible electronic components. As such, the method affords advantages that are similar to those of the device according to invention, in particular in limiting the power consumption of the components implementing the method according to the invention.

LIST OF CITED DOCUMENTS

Vandersypen 2016: "*Interfacing spin qubits in quantum dots and donors—hot, dense and coherent*", ARXIV.ORG, 18 Dec. 2016, DOI: 10.1038/S41534-0038-Y Bonteanu 2017: "*A current controlled CMOS current amplifier*", G. Bonteanu, DOI: 10.1109/ISEEE.2017.8170668

L. Le. Guevel 2020: L. Le. Guevel et al., "19.2 A 110 mK 295 µW 28 nm FDSOI CMOS Quantum Integrated Circuit with a 2.8 GHz Excitation and nA Current Sensing of an On-Chip Double Quantum Dot," 2020 *IEEE International Solid-State Circuits Conference—(ISSCC)*, San Francisco, CA, USA, 2020, pp. 306-308, DOI: 10.1109/ISSCC19947.2020.9063090.

Yoon 2004: Sangwoong Yoon, "LC-tank CMOS Voltage-Controlled Oscillators using High Quality Inductors Embedded in Advanced Packaging Technologies", Georgia Institute of Technology 2004

Reilley 2007: "*Fast single-charge sensing a RF quantum point contact*" D. J Reilley et al., APPLIED PHYSICS LETTERS 91, 162101, 2007

The invention claimed is:

1. A quantum device comprising:
   multiple spin qubits, each comprising at least one quantum dot,
   multiple electrometers, each being capacitively coupled to a potential well of the at least one quantum dot of at least one of the spin qubits, and
   multiple injection-locked oscillators, each being coupled to at least one electrode of one of the electrometers and designed to transmit an oscillating signal, called an excitation signal, to at least one input electrode of the electrometer to which it is coupled, each excitation signal having a different frequency,
   further comprising:
   an amplification circuit comprising at least one amplifier, said amplification circuit being coupled to the output of each electrometer and comprising an output,
   and in that said device comprises a feedback loop coupling the output of said amplification circuit to an input of each injection-locked oscillator and through which an electrical signal, called an injection signal, flows, comprising components at the frequencies of said excitation signals, each injection-locked oscillator being designed to receive the injection signal and, as a function of said injection signal, keep its excitation signal in a first operating state or decrease its excitation signal to a second operating state.

2. The device according to claim 1, wherein the injection signal has a spectrum comprising a line associated with each excitation signal, each line of said spectrum having an amplitude that is dependent on a state of the spin qubit.

3. The device according to claim 2, wherein each injection-locked oscillator is designed to:
   operate in its first operating state when the amplitude of the injection signal, at the corresponding line, is lower than a threshold, and
   operate in its second operating state when the amplitude of the injection signal, at the corresponding line, is higher than or equal to said threshold.

4. The device according to claim 1, wherein, for each injection-locked oscillator, the excitation signal transmitted in the first operating state is at least 10 times greater than the excitation signal transmitted in the second operating state.

5. The device according to claim 1, comprising multiple measurement means, each being coupled to an injection-locked oscillator, each measurement means being designed to detect the operating state of said injection-locked oscillator and, depending on the detected state, to transmit a signal, called a measurement signal, relating to a spin state.

6. The device according to claim 1, wherein the amplification circuit is designed to negatively amplify a signal output by the electrometers.

7. The device according to claim 1, wherein the amplification circuit is designed to perform current amplification or, when the at least one amplifier of the amplification circuit comprises at least one transimpedance amplifier, designed to convert an input signal into a voltage at the output of said amplification circuit.

8. The device according to claim 1, wherein each electrometer comprises a drain, and a gate, injection-locked oscillators being coupled to the drain or to the gate.

9. The device according to claim 1, wherein each electrometer comprises a quantum point contact or a single-electron transistor.

10. The device according to claim 1, comprising multiple bias circuits, each being coupled to an electrometer and arranged to apply a DC bias voltage to said electrometer which is designed so that each electrometer produces a Coulomb blockade.

11. The device according to claim 1, wherein:
the spin qubits are arranged in a spin qubit array comprising n rows in a first direction and m columns in a second direction, and
the electrometers are arranged in the form of an array positioned facing the spin qubit array so that the at least one quantum dot of one of the electrometers is capacitively coupled to at least one quantum dot of at least one spin qubit.

12. The device according to claim 11, wherein the amplification circuit comprises:
m amplifiers arranged in the second direction, each amplifier being coupled to all of the electrometers coupled to spin qubits positioned on one and the same column of the spin qubit array, the output of each amplifier being coupled to the input of the injection-locked oscillator, said device further comprising:
n excitation means arranged in the first direction, each injection-locked oscillator being coupled to all of the electrometers coupled to spin qubits positioned on one and the same row of the spin qubit array,
m switches arranged in the second direction and positioned upstream or downstream of the amplification circuit, each switch being arranged so as to alternately connect all of the electrometers coupled to spin qubits positioned on one and the same column of the spin qubit array to the corresponding amplifier or to the corresponding injection-locked oscillator.

13. The device according to claim 11, comprising:
n excitation means arranged in the first direction, each injection-locked oscillator being coupled to all of the electrometers coupled to spin qubits positioned on one and the same row of the spin qubit array, the amplification circuit comprising a single amplifier, said device further comprising:
m switches arranged in the second direction, each switch being arranged so as to alternately connect all of the electrometers coupled to spin qubits positioned on one and the same column of the spin qubit array to the amplifier, the output of the amplifier being coupled to each injection-locked oscillator.

14. The device according to claim 12, wherein each spin qubit alternately comprises two states, a high state and a low state, when a quantum dot of one of the electrometers is coupled to at least one quantum dot of at least two spin qubits, said device further comprising a processing unit configured to retrieve, by triangulation, the state of each spin qubit from a signal transmitted by each electrometer, said signal being dependent on the state of the spin qubit.

15. A method for reading multiple spin qubits, each comprising a quantum dot, said method using multiple electrometers, each being capacitively coupled to a potential well of the at least one quantum dot of at least one of the spin qubits, multiple injection-locked oscillators, each being coupled to at least one electrode of one of the electrometers, an amplification circuit, said amplification circuit being coupled to the output of each electrometer and comprising at least one amplifier and an output, said method comprising:
each of the injection-locked oscillators transmitting an oscillating signal, called an excitation signal, to at least one input electrode of the electrometer to which it is coupled, each excitation signal having a different frequency, wherein said method further comprises:
injecting a signal, called an injection signal, into each injection-locked oscillator via a feedback loop coupling the output of said amplification circuit to the input of each injection-locked oscillator, the injection signal comprising components at the frequencies of said excitation signals and, for each injection-locked oscillator, decreasing or maintaining the excitation signal resulting from said injection signal.

* * * * *